(12) United States Patent
Cadek et al.

(10) Patent No.: US 7,990,680 B2
(45) Date of Patent: Aug. 2, 2011

(54) POROUS COKE AND METHOD OF PRODUCING THE POROUS COKE

(75) Inventors: Martin Cadek, Augsburg (DE); Wilhelm Frohs, Allmannshofen (DE); Mario Wachtler, Ulm (DE)

(73) Assignee: SGL Carbon SE, Wiesbaden (DE)

( * ) Notice: Subject to any disclaimer, the term of this patent is extended or adjusted under 35 U.S.C. 154(b) by 0 days.

(21) Appl. No.: 12/542,258

(22) Filed: Aug. 17, 2009

(65) Prior Publication Data

US 2010/0014216 A1 Jan. 21, 2010

Related U.S. Application Data

(63) Continuation of application No. PCT/EP2008/051885, filed on Feb. 15, 2008.

(30) Foreign Application Priority Data

Feb. 15, 2007 (EP) .................. 07 102 487
Jul. 12, 2007 (EP) .................. 07 112 394

(51) Int. Cl.
   *H01G 9/00* (2006.01)
(52) U.S. Cl. ........ 361/502; 361/503; 361/504; 361/509; 361/512; 361/523
(58) Field of Classification Search .................. 361/502, 361/503–504, 509–512, 516–519, 523–529; 29/25.01, 25.03
See application file for complete search history.

(56) References Cited

U.S. PATENT DOCUMENTS

| 6,346,225 | B1 | 2/2002 | Rao et al. |
| 6,487,066 | B1 * | 11/2002 | Niiori et al. .................... 361/502 |
| 6,830,594 | B2 * | 12/2004 | Shinozaki et al. ........... 29/25.03 |
| 6,882,517 | B2 | 4/2005 | Tano et al. |
| 7,564,676 | B2 * | 7/2009 | Kitajima et al. ............... 361/502 |

FOREIGN PATENT DOCUMENTS

| JP | 2005 001969 A | 1/2005 |
| JP | 2006 295144 A | 10/2006 |
| RU | 2095873 C1 | 11/1997 |
| RU | 2144231 C1 | 1/2000 |
| WO | 98/28369 A1 | 7/1998 |

OTHER PUBLICATIONS

International Search Report, dated Jun. 19, 2008.

* cited by examiner

*Primary Examiner* — Nguyen T Ha
(74) *Attorney, Agent, or Firm* — Laurence A. Greenberg; Werner H. Stemer; Ralph E. Locher (57) ABSTRACT

In a method of manufacturing a porous coke suitable as a charge-storing material in electrochemical capacitors, one manufactures or provides a non-calcined isotropic coke with spherical or onion-shaped morphology and low graphitizability as a starting material. The starting material is comingled with a caustic alkali to obtain a homogenous mixture. The homogenous mixture is heat treated at a temperature in a range between 650 and 950° C. to obtain the porous coke. The porous coke is washed and neutralized.

12 Claims, 5 Drawing Sheets

POROUS COKE AND METHOD OF PRODUCING THE POROUS COKE

CROSS-REFERENCE TO RELATED APPLICATION

This is a continuation, under 35 U.S.C. §120, of copending international application No. PCT/EP2008/051885, filed Feb. 15, 2008, which designated the United States; this application also claims the priority, under 35 U.S.C. §119, of European patent application Nos. EP 07 102 487.1, filed Feb. 15, 2007 and EP 07 112 394.7, filed Jul. 12, 2007; the prior applications are herewith incorporated by reference in their entirety.

BACKGROUND OF THE INVENTION

Field of the Invention

The present invention relates to a porous coke, which can be used as an electrode material for electrochemical capacitors.

Electrochemical capacitors are devices which store electrical energy by separation of charged species in an electrical double layer at the electrode/electrolyte interface. The electrodes of such a capacitor have to be electrically conductive and electrochemically inert over a wide range of voltage. Furthermore, even over a large number of charging/discharging cycles the capacitance must not significantly degrade.

U.S. Pat. No. 6,882,517 discloses microcrystalline carbon having a layered crystal structure similar to graphite. The material is characterized by a specific surface area of 300 m$^2$/g or below (determined by the nitrogen adsorption method) and an interlayer distance d$_{002}$ of the microcrystalline carbon in a range from 0.360 to 0.380 nm.

The preparation of the microcrystalline carbon material includes the steps of preparing a raw material containing microcrystalline carbon having a layered crystal structure similar to graphite; heat treating the raw material in an inert gas atmosphere in a temperature range from 600 to 900° C. and then cooling down to 100° C. or below, and then activation treating the carbon material.

The activation can be performed by mixing caustic alkali with the heat-treated carbon raw material and heating preferably to a temperature of at least 400° C., more preferably of at least 800° C. The caustic alkali includes KOH, NaOH, RbOH, CsOH, and the like, and mixtures of caustic alkali (such as KOH and NaOH). Among these, KOH is preferred.

For example, the heat-treated raw carbon material is mixed with caustic alkali in a mass ratio equivalent to 1 to 4 times, and is heated to the above-described temperature range under inert gas atmosphere for 1 to 6 hours.

After activation, the alkali is removed by cleaning with water, steam cleaning or the like. Additionally, it is possible to apply other methods including neutralization with an acid, electrochemical treatment, ultrasonic treatment and the like. However, when a plurality of treatment methods are combined, it is preferable to perform water cleaning in the final stage. Such water cleaning is preferably continued until the pH of the drainage is close to 7.

Fabrication of electrodes for electrochemical capacitors is known in the art. For example, when fabricating a sheet electrode, the carbon electrode material is crushed down to a size range from about 5 to 100 μm and grain sizes are adjusted. Then, a conductive agent such as carbon black for imparting electric conductivity to the microcrystalline carbon powder and a bonding agent like PTFE are added thereto, and the material is kneaded. Then, the kneaded material is rolled and drawn into a sheet shape to obtain the carbon electrode. It is also possible to use powder graphite and the like as the conductive agent, and PVDF, PE, PP, and the like as the bonding agent. The compounding ratio of the microcrystalline carbon, the conductive agent, and the bonding agent is set between 10:1:0.5 and 10:0.5:0.25, for example.

Electric double layer capacitors were assembled with an anode and a cathode each containing a composition of the microcrystalline carbon material, carbon black additive and PTFE binder in the mass ratio 10:1:0.5. The electrolyte was tetraethylammonium tertrafluoroborate in propylene carbonate. The capacitance of the overall capacitors was determined from discharge curves. The capacitance is given as volumetric capacitance (calculated by dividing this capacitance by the volume of both electrodes). A volumetric capacitance of about 35 F/ml was obtained. The volumetric energy density of the capacitors was about 44 Wh/l.

According to U.S. Pat. No. 6,882,517 it is inevitable that the carbon raw material has a layered crystal structure similar to graphite. More specifically it is required that the raw material carbon has an interlayer distance d$_{002}$ determined by an X-ray diffraction method in a range from 0.34 to 0.35 nm and an integrated intensity of the X-ray diffraction peak corresponding to the 002 lattice plane equal to or more than 10% of graphite. Furthermore, it is required that an interlayer distance d$_{002}$ of 0.337 nm or below and a crystallite size La$_{110}$ of 80 nm or more is obtained, when the carbon raw material is heated to a temperature of 2,800° C. in inert gas atmosphere. Thus, the raw material is required to be of high graphitizability. Raw materials not meeting this criterion were found to give inferior capacitances, despite the fact that the specific surface area of most of the carbon materials not exhibiting the desired crystallite structure was much higher.

Surprisingly, it was found that alkaline treatment of such kinds of coke which are not readily graphitizable resulted in an excellent electrode material, allowing for high individual electrode capacitance (up to 160 F/g) when applied in electrochemical double layer capacitors.

SUMMARY OF THE INVENTION

It is accordingly an object of the invention to provide a porous coke and a method of producing the porous coke that overcomes the above-mentioned disadvantages of the prior art methods and devices of this general type.

With the foregoing and other objects in view there is provided, in accordance with the invention, a method of manufacturing a porous coke suitable as a charge-storing material in electrochemical capacitors. In the method one manufactures or provides a non-calcined isotropic coke with spherical or onion-shaped morphology and low graphitizability as a starting material. The starting material is comingled with a caustic alkali to obtain a homogenous mixture. The homogenous mixture is heat treated at a temperature in a range between 650 and 950° C. to obtain the porous coke. The porous coke is washed and neutralized.

Thus the present invention pertains to a porous coke obtained from hardly graphitizable (almost non-graphitizable) coke, a method to obtain this porous coke, an electrode for an electrochemical double layer capacitor containing the porous coke and an electrochemical double layer capacitor containing at least one of the electrodes.

The porous coke of the present invention is obtained by treatment of hardly graphitizable, non-calcined coke with caustic alkali. Thus the present invention provides a porous coke which is the product of alkaline treatment of non-calcined hardly graphitizable coke, and which is suitable as an electrode material for electrochemical double layer capacitors.

The electrochemical double layer capacitor of the present invention includes two electrodes and an electrolyte assembled between the electrodes with at least one of the electrodes containing a porous coke which is the product of alkaline treatment of non-calcined hardly graphitizable coke.

Other features which are considered as characteristic for the invention are set forth in the appended claims.

Although the invention is illustrated and described herein as embodied in a porous coke and a method of producing the porous coke, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The coke used in the present invention is only to a very low degree graphitizable by heat treatment above 2,200° C. under an inert gas atmosphere. The coke used in the present invention is further characterized by its high isotropy, an onion-shaped or spherical morphology similar to shot coke from the delayed coking process. Further this coke is unique by its high hardness. The porosity is very low, resulting in a very small specific surface area.

Preferably, the raw coke has an interlayer distance $d_{002}$ determined by X-ray diffraction method above 0.35 nm and an apparent stacking height $L_c$ below 6.5 nm.

A suitable coke for the present invention is obtainable from the quenching oil used in quenching of the reaction gas in the synthesis of unsaturated hydrocarbons. A fraction of the quenching oil is lead away to a coker which is heated to about 500° C. The volatile matter evaporates very quickly, and a fine-grained coke is withdrawn from the bottom of the coker. Due to the special way of its formation, this coke is distinguished by a high purity (more than 96% by weight carbon). It is free of ash (at most 0.05% by weight) and mineral matter.

According to the IUPAC definition, coke is a solid high in content of the element carbon and structurally in the non-graphitic state, which is produced by pyrolysis of organic material which has passed, at least in part, through a liquid or liquid-crystalline state during the carbonization process. However, due to rapid formation of the coke during the quenching process the preorientation of aromatic layers, as know to occur during the mesophase formation is not possible to an extent known from coking processes like the delayed coking. Hence, this coke obtained from the gas quenching process is only to a very low degree graphitizable by heat treatment above 2,200° C. Indeed, after heat treatment at 2,800° C., the mean interlayer distance c/2 determined from the X-ray diffraction peak $d_{002}$ is 0.3375 nm or higher and the crystallite size in c-direction ($L_c$) is below 35 nm, and $La_{110}$ is below 60 nm, preferably below 50 nm.

The coke is subjected to the alkaline treatment in the green state, i.e. it is not calcined before the alkaline treatment. Calcination means a heat treatment under reducing atmosphere in a temperature range above 1,600 K, resulting in elimination, burning and coking of water and volatile combustible matter like hydrocarbons and hydrogen. In contrast, coke which is obtained at temperatures below 900 K is designated as green coke. Due to the omitting of the calcination process, the coke used as a raw material for the present invention contains around 4% by weight of volatile combustible material. About 85% by weight of the volatile combustible material is formed of hydrogen, carbon monoxide and methane, while the residue is comprised of higher and aromatic hydrocarbons. The fact that calcination of the coke is not necessary is a significant advantage because it allows to save energy and time.

For the alkaline treatment the coke is preferably provided with a particle size below 0.4 mm. The desired particle size is obtained by usual methods like sieving and/or grinding the raw coke. Caustic alkali like sodium hydroxide or potassium hydroxide or a mixture of those hydroxides is used in the alkaline treatment. The weight ratio between hydroxide and coke is adjusted to the range between 3:1 and 4:1. The coke and the hydroxide is comingled to obtain an intimate, homogeneous mixture. This mixture is than heat-treated at a temperature in the range between 650 and 950° C., preferably at about 850° C. The duration of the heat treatment is preferably between 0.5 and 2 hours. Most preferably, the alkaline treatment is preformed in continuous manner in a rotary kiln.

To remove the residual alkali, the alkaline-treated coke is washed with deionized or demineralized water. Preferably, the residual alkali is removed by neutralization with hydrochloric acid or sulfuric acid, followed by multiple washing with deionized or demineralized water. The mass loss due to the alkaline treatment and washing is in the range of 40 to 60% by weight.

The alkaline treatment effects a slight decrease of the particle size of the coke and a strong increase of the BET surface and porosity. The BET surface of the porous coke according to the present invention is above 2,000 m²/g, preferable above 2,400 m²/g.

A maximum of the pore size distribution is in the transition region from large micropores to small mesopores, i.e. around 2 nm. Regarding porosity, the definitions developed by the IUPAC are applied, i.e. pores with a diameter of less than 2 nm are referred to as micropores, pores with diameters between 2 nm and 50 nm as mesopores and pores with a diameter higher than 50 nm as macropores. For capacitor materials, a network of interconnected micropores and mesopores is desired, because the presence of micropores increases the electrode/electrolyte interface, while the mesopores facilitate access of the ions to the microporous surface.

The porous coke according to the invention remains the property of the raw coke starting material of being only to a low degree graphitizable by heat treatment above 2,200° C.

Hence, the porous coke according to this invention can be characterized, after heat treatment at 2,800° C., by X-ray analysis where the mean interlayer distance c/2 determined from the X-ray diffraction peak $d_{002}$ is 0.338 nm or higher and the crystallite size in c-direction ($L_c$) is below 25 nm, and $La_{110}$ is below 70 nm, preferably below 50 nm.

Electrodes containing the porous coke of the present invention are prepared in a similar manner as described in U.S. Pat. No. 6,882,517 and generally known in the art.

Preferably polyvinylidene fluoride (PVDF) is used as the binder. The weight fraction of the binder in the electrode material is in the range from 2 to 20%, preferably around 10%.

Any suitable conductive auxiliary agent can be added, if necessary. Suitable conductive agents are for example carbon black, carbon nanotubes, carbon cones, carbon nanofibers, natural graphite, expanded graphite and milled flexible graphite. The weight fraction of the conductive auxiliary agent is between 0 and 20%, preferably around 5%.

Electrochemical double layer capacitors are obtained by assembling two electrodes, at least one of them containing the porous coke of the present invention, with a suitable electrolyte. In one embodiment, the capacitor is a symmetric capacitor. This means that both electrodes have the same composition as regards the kind and amount of the charge-storing material, the applied binder and auxiliary conductive agent. Alternatively, an electrode containing a porous coke according to the present invention can be combined with a suitable electrode of a different composition, either containing a porous coke of the present invention or another charge-storing material, to form an asymmetric capacitor.

Suitable electrolytes are aqueous electrolytes like caustic potash solution (for instance in a concentration of 6 mol/l) and sulfuric acid (for instance in a concentration of 1 mol/l) or non-aqueous, organic electrolytes like tetraethylammonium tetrafluoroborate (TEABF$_4$) in a concentration of 1 mol/l dissolved in a suitable solvent like acetonitrile or propylene carbonate. Organic electrolytes are preferable because they allow for a higher charging/discharging voltage range, because there is no limit due to electrochemical decomposition of water. However, the conductivity of organic electrolytes is lower compared to aqueous electrolytes.

With such capacitors, at a gravimetric charging current density of 100 mA/g a gravimetric capacitance of more than 200 F/g for each electrode is obtained in an aqueous acidic electrolyte and of more than 160 F/g for each electrode in an organic electrolyte. The gravimetric capacitance is the capacitance divided by the mass of porous coke in the electrode.

The gravimetric energy density for the two-electrode combination (without Ohmic drop) at a gravimetric power density in the range of 50 to 1000 W/kg amounts to between 3 and 5 Wh/kg in aqueous and 20 to 30 Wh/kg in organic electrolyte.

The cyclic voltammogramm of the capacitor in either aqueous or organic electrolyte (FIGS. 1 and 2) have the shape of a distorted rectangle. This allows for the conclusion that the capacitance is mainly related to electrostatic processes (charging/discharging of the electrostatic double layer) in the electrode/electrolyte interfaces. With an ideal (purely electrostatic) capacitor, the shape should be exactly rectangular, because the current remains constant when the capacitor is charged/discharged by linear variation of the voltage with time (constant scan rate). The deviation from the rectangular shape might be attributed to the Ohmic series resistance of the capacitor and to the occurrence of faradaic redox processes at the electrode/electrolyte interface. The latter might be related to modified surface functionalities formed during the alkaline treatment.

The capacitance remains stable during some thousands of charging/discharging cycles, as it is required for practical applications as rechargeable energy storage.

EXAMPLES

The coke used in the examples was a hardly graphitizable coke with onion like structure obtained from the quenching oil used for heavy oil quenching in the synthesis of unsaturated hydrocarbons. Due to its special origin, the coke is of superior purity (see Table 1). The ash value was 0.01%. The BET surface of the coke was 26 m$^2$/g.

TABLE 1

| impurity content obtained from ash analysis | |
|---|---|
| impurity | content/[ppm] |
| Al | 1.5 |
| B | 3 |
| Ca | 1.7 |
| Cr | 3.3 |
| Cu | 0.3 |
| Fe | 24.5 |
| K | 1.6 |
| Mg | 0.8 |
| Na | 14.1 |
| Ni | 2.1 |
| P | 3.4 |
| Si | 13.7 |
| Sn | 1.1 |
| W | 0.5 |
| Zn | 0.2 |
| Zr | 0.6 |

Alkaline treatment of the coke was carried out as described above with caustic potash agent at a temperature of 850° C. The particle size of the raw coke before the treatment was between 0.1 and 0.4 mm. In a first example, the caustic potash to coke ratio was 3:1. In a second example, the caustic potash to coke ratio was 4:1.

After alkaline treatment and washing, the coke of example 1 had a BET surface of 2,440 m$^2$/g, and the coke of example 2 had a BET surface of 2,657 m$^2$/g. Both materials were microporous with a maximum in the pore size distribution at a pore size 2-3 nm, i.e. in the transition range from large micropores to small mesopores. The particle size has slightly diminished due to the alkaline treatment, being now mainly in the range between 20 and 300 μm. The diminishing of the particle size was stronger in the example with the higher caustic potash to coke ratio.

Additionally, a sample of the starting coke was subjected to a heat treatment at 2,800° C. The heat treatment at 2,800° C. was solely carried out to study the graphitization behavior of the coke, it is not part of the process according to the invention. X-ray diffraction data of the starting coke, the coke sample which was heat-treated at 2,800° C. and the coke after the alkaline treatment are shown in Table 2.

TABLE 2

X-ray diffraction data

| material | d002/ [nm] | Lc002/ [nm] | La110/ [nm] | integrated intensity of the XRD-peak corresponding to the 002 lattice plane/[%] |
|---|---|---|---|---|
| starting coke | 0.3526 | 2.2 | / | 9 |
| coke after heat treatment at 2800° C. | 0.3414 | 16 | 30 | / |
| coke after alkaline treatment | 0.3751 | 1.7 | / | 2 |

Electrodes were prepared and symmetric capacitors were assembled as described above. Each electrode contained 7 g of porous coke. PVDF was used at the binder and carbon black as conductive auxiliary agent. The fraction of PVDF was 10% and the fraction of carbon black was 5% of the weight of the electrode composition (containing porous coke, binder and conductive auxiliary agent). For each example of porous coke, one capacitor was prepared with 1 mol/l sulfuric acid as the electrolyte, the other one with an electrolyte containing tetraethylammonium tetrafluoroborate (TEABF$_4$) in a concentration of 1 mol/l dissolved in a suitable solvent like acetonitrile.

The electrochemical behavior of the capacitors was studied using cyclic voltammetry (scan rates from 1 to 100 mV/s), galvanostatic charging/discharging (current densities from 200 mA/g to 20 A/g in the voltage range from 0 to 0.8 V (aqueous electrolyte) or, resp., 0 to 2 V (organic electrolyte) and electrochemical impedance spectroscopy (frequency range from 100 kHz down to 1 mHz).

Figure 1:
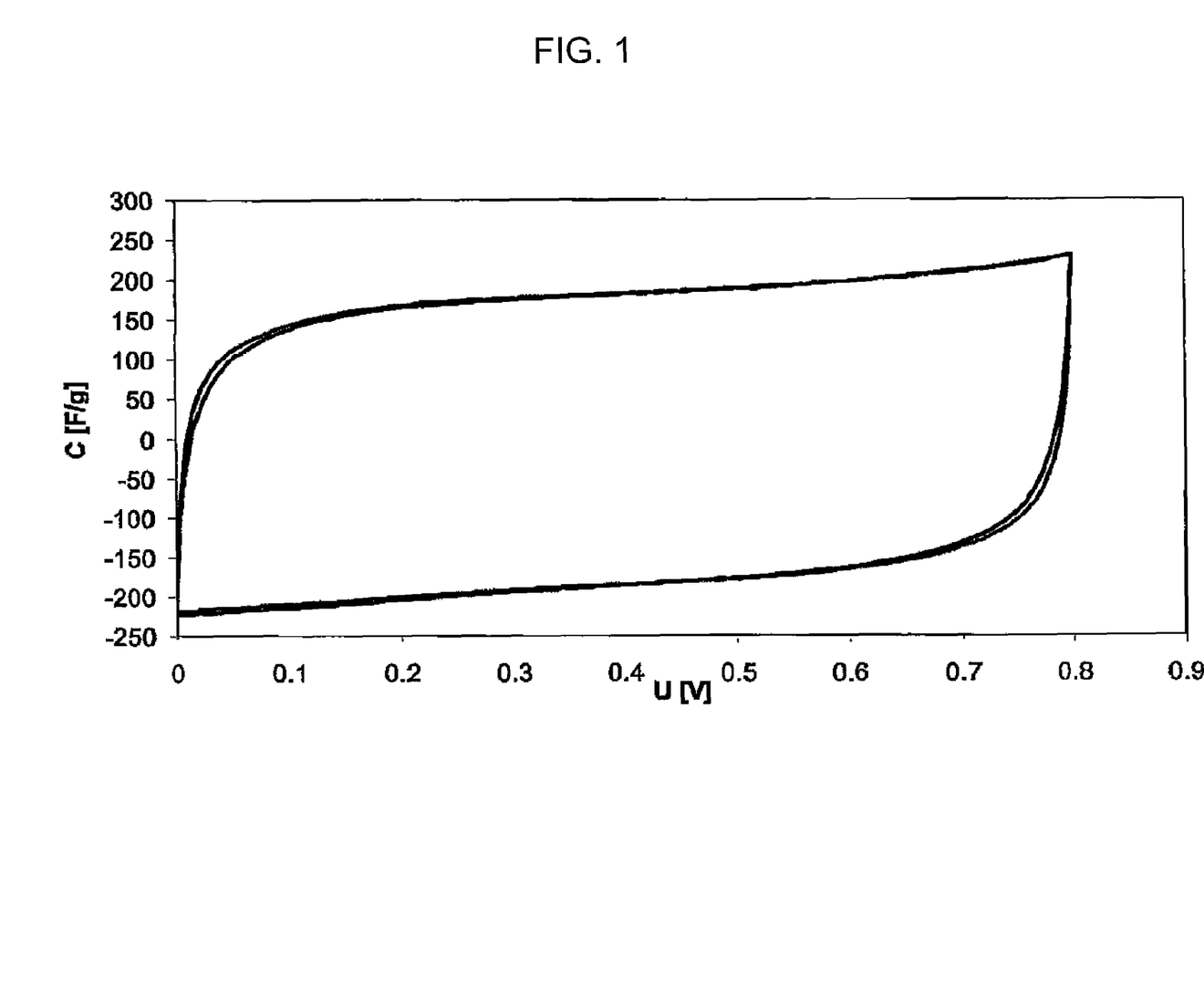
FIG. 1 is a graph showing a cyclic voltammogramm of a capacitor according to the invention with an aqueous electrolyte.
Figure 2:
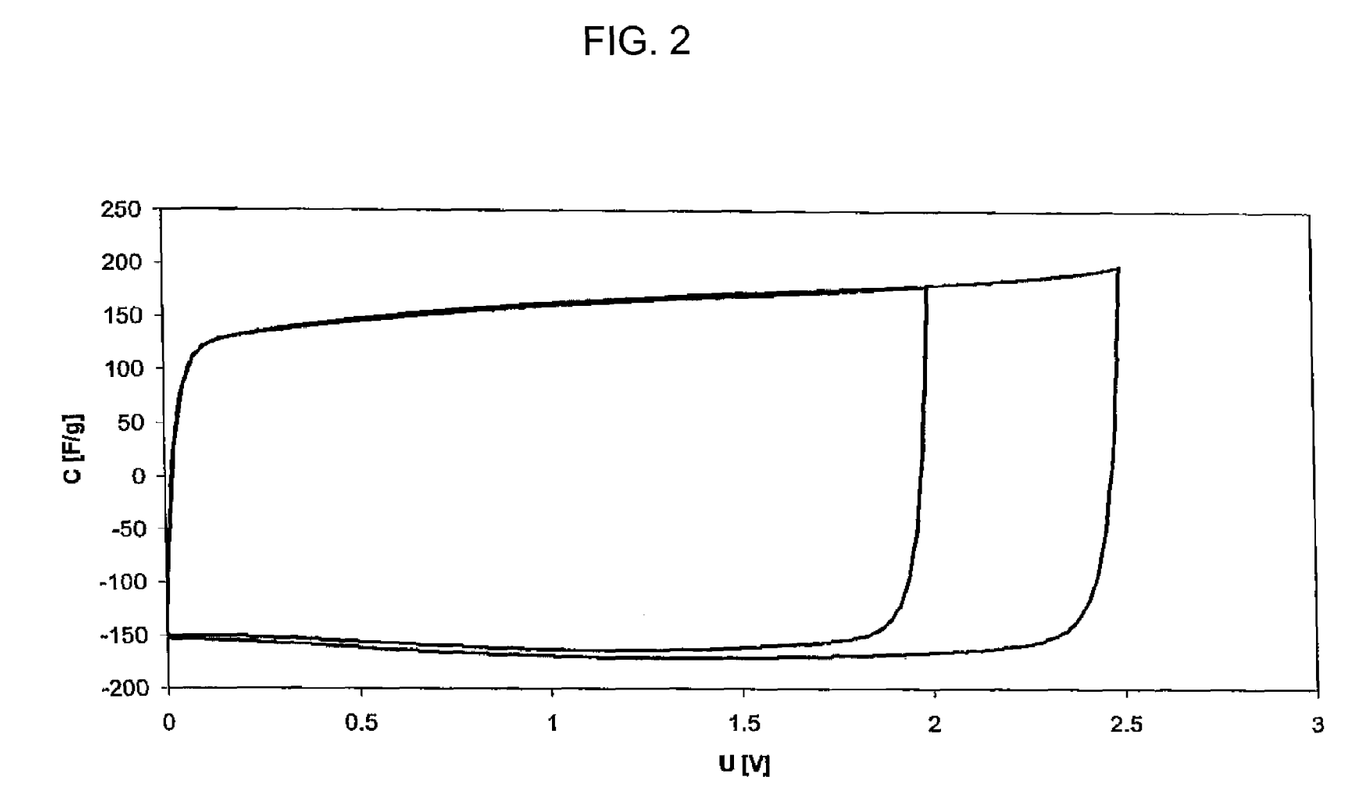
FIG. 2 is a graph showing the cyclic voltammogramm of the capacitor according to the invention with an organic electrolyte.

FIG. 1 shows a cyclic voltammogramm of the capacitor with the porous coke of example 1 in aqueous electrolyte, and FIG. 2 with organic electrolyte, each recorded at a scan rate of 10 mV/s. The cyclic voltammogramm has a slightly distorted rectangular shape which extends over a voltage range between 0 and 0.8 V in aqueous electrolyte and between 0 and 2 V or even 2.5 V in organic electrolyte. Thus the capacitor can be reversibly charged in a wide voltage range.

The capacitance C could be calculated from the cyclic voltammograms according to the formula $$C = \frac{i}{v} = i * \frac{dt}{dE}$$

wherein i is the current in the rectangular region and v is the scan rate (variation of voltage with time dE/dt) at which the cyclic voltammogram was recorded.

Alternatively, the capacitance C was calculated from the galvanostatic cyclic experiments according to the formula $$C = i * \frac{dt}{dE}$$

wherein i is the current charging the electrode, dE is the variation of the voltage during charging and dt is the time duration of charging.

Figure 3:
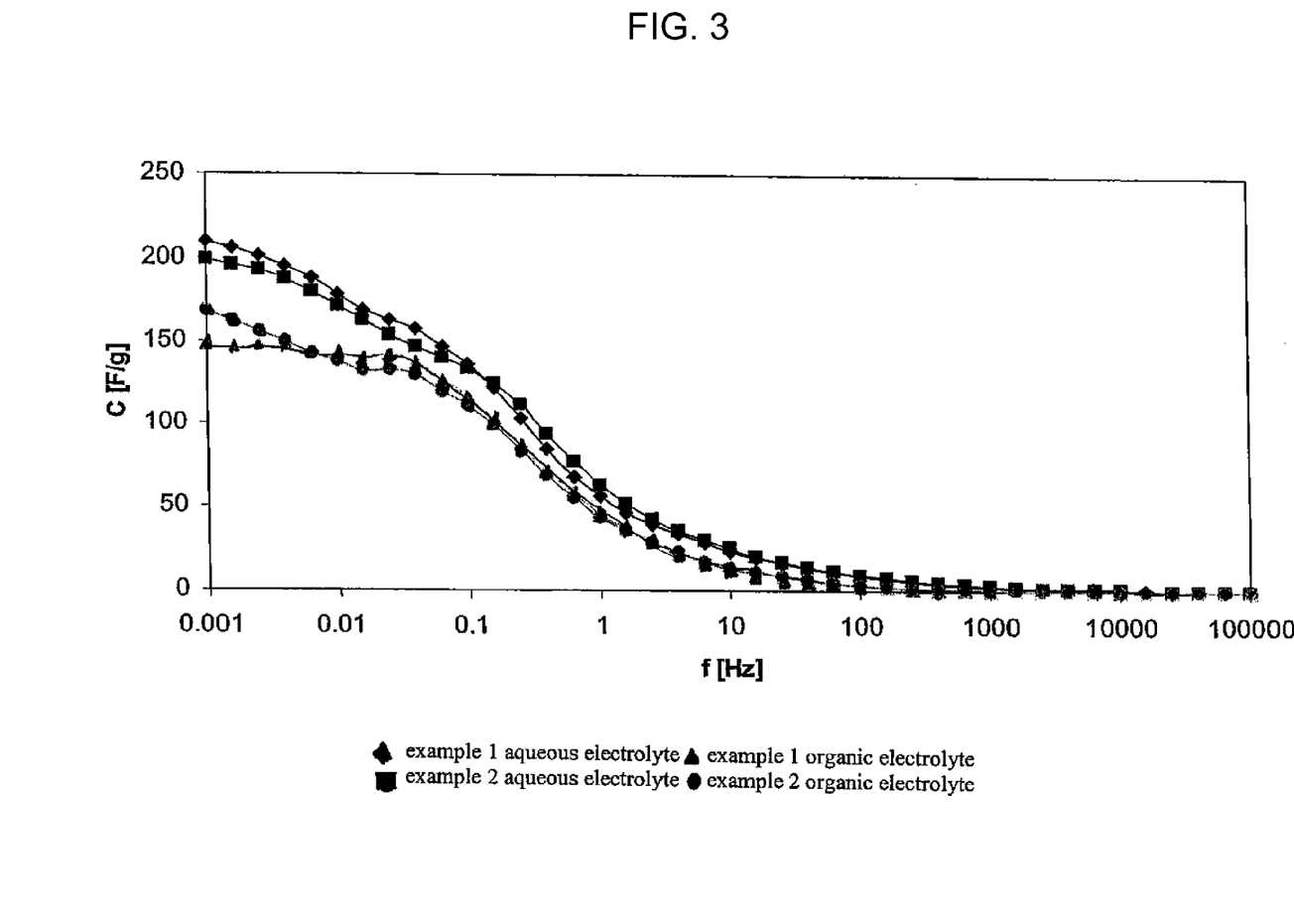
FIG. 3 is a graph showing an electrochemical impedance spectra of capacitors according to the invention (capacitance as a function of the frequency)

In a third method, the capacitance can be determined from the low frequency limit of the electrochemical impedance spectrum. Typical impedance spectra are shown in FIG. 3. As expected for a capacitor, at low frequencies the capacitance approaches a limiting value which is very close to the value obtained from cyclic voltammograms recorded with low scan rate and from galvanostatic charging/discharging with low current density.

Values of the gravimetric capacitance obtained with those three methods for both, capacitors with aqueous and organic electrolyte, are compiled in Table 3.

A certain dependence of the capacitance on the scan rate of the cyclic voltammetry and on the current density of the galvanostatic cycles has to be noted. At high charging/discharging rates, the small size pores appear to be not as readily available for the formation of the electrical double layer. Thus, the total effective available area of the electrical double layer at high charging-discharging rates is less than the area that is available at lower charging-discharging rates. In organic electrolyte, this effect is even more pronounced due to the bulkiness of the ions of the organic electrolyte. Furthermore, in organic electrolyte the charging/discharging current is limited due to the low conductivity of the electrolyte compared to the aqueous system, because there are no protons in the organic electrolyte.

Figure 4:
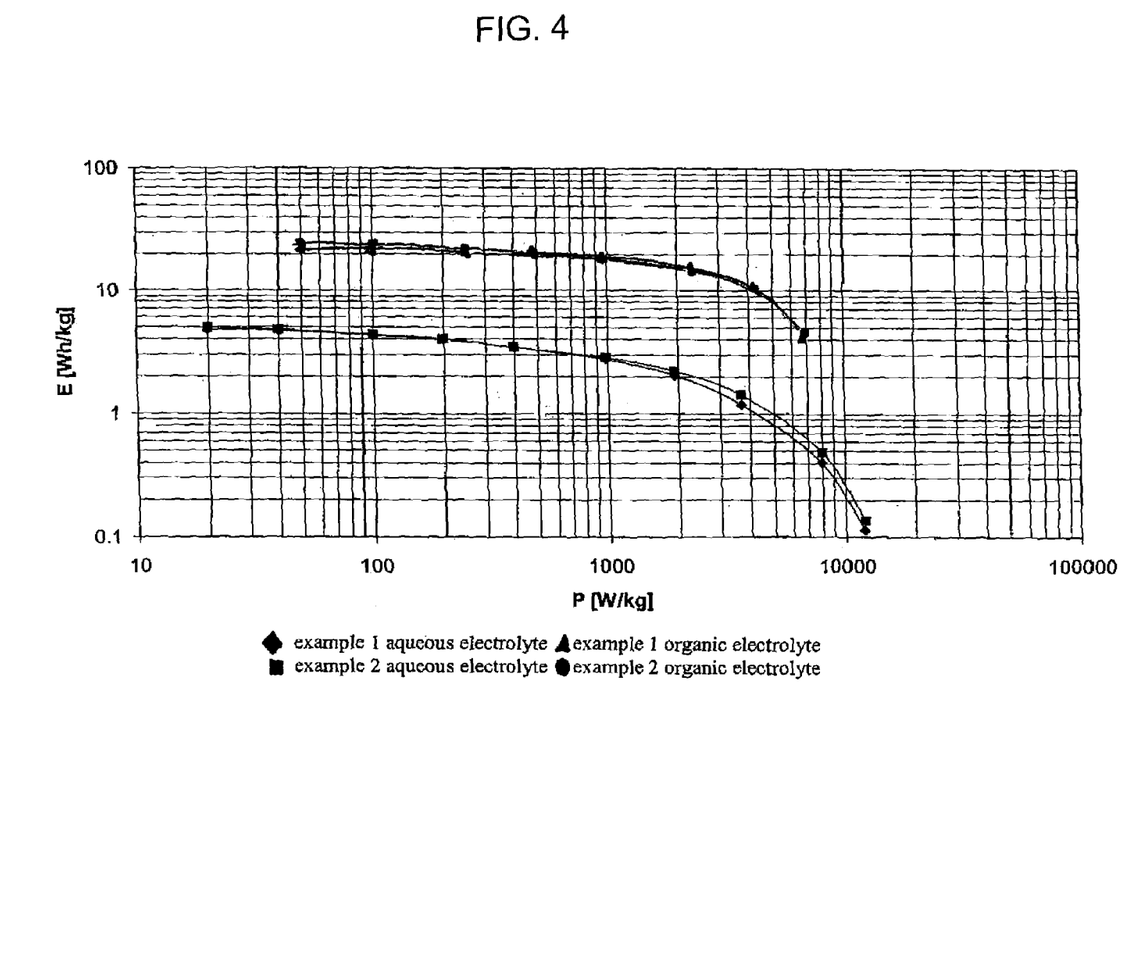
FIG. 4 is a graph showing Ragone plots of capacitors according to the invention (energy density as a function of the power density)

The Ragone plot in FIG. 4 shows the available energy per unit mass of charge-storing material of the two-electrode-combination as a function of the gravimetric power density. At power densities below 1000 W/kg, the available energy does not decrease significantly with increasing power density. However, at higher power density there is a remarkable decrease of the available energy, reflecting the limited utilization of the electrode/electrolyte interface at fast charging/discharging.

Figure 5:
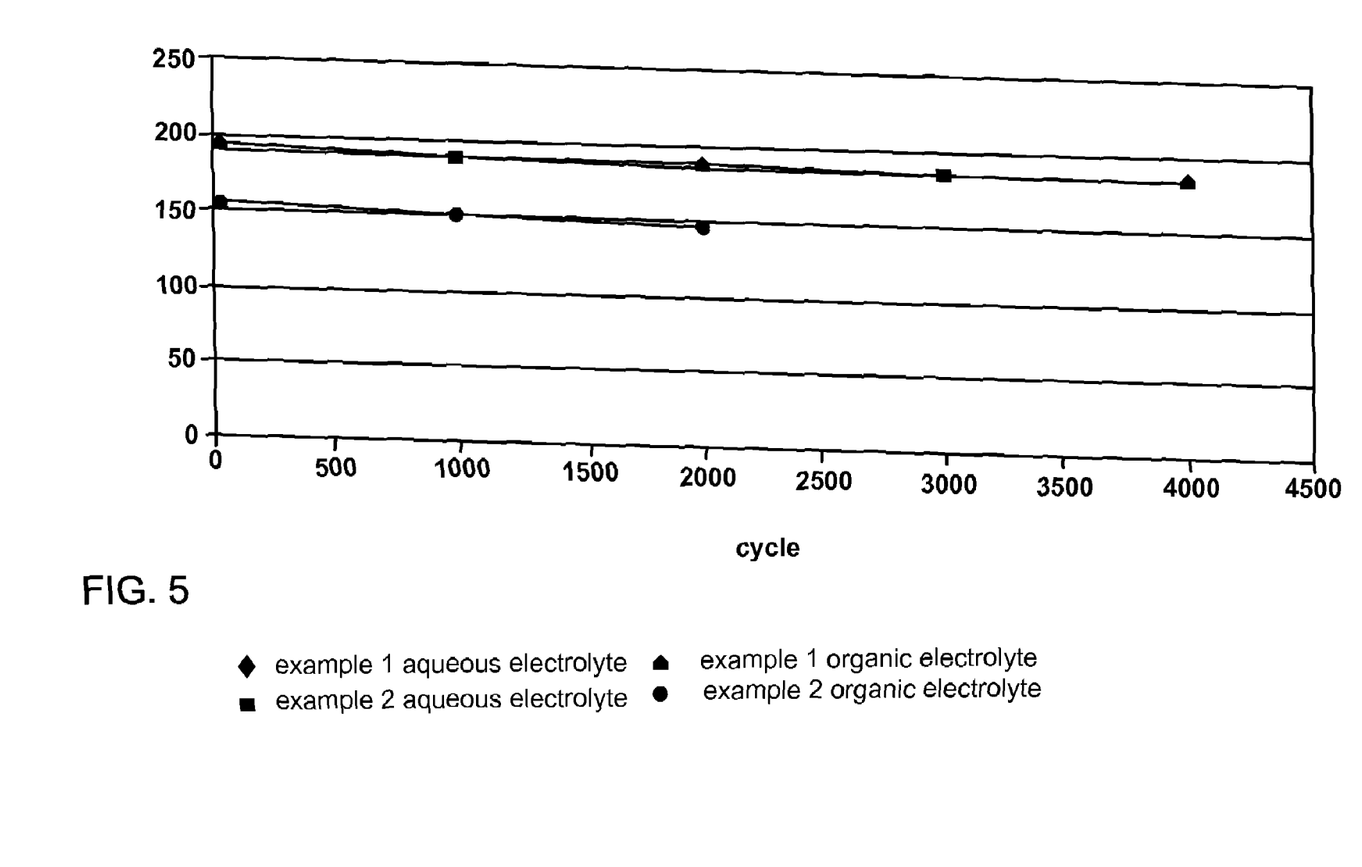
FIG. 5 is a graph showing the dependence of the capacitance on the number of charge cycles.

The development of the capacitance during a large number of charge/discharge cycles with a current of 500 mA/g in the voltage range from 0 to 0.8 V (aqueous electrolyte) or, resp., 0 to 2 V (organic electrolyte) can be seen in FIG. 5. Especially for the capacitor with the organic electrolyte, excellent stability of the capacitance over 10,000 cycles was observed.

TABLE 3 gravimetric and volumetric capacitance obtained with different methods

| | | aqueous electrolyte | | | | organic electrolyte | | | |
|---|---|---|---|---|---|---|---|---|---|
| | | coke of example 1 capacitance | | coke of example 2 capacitance | | coke of example 1 capacitance | | coke of example 2 capacitance | |
| Method | parameter | [F/g] | [F/cm$^3$] | [F/g] | [F/cm$^3$] | [F/g] | [F/cm$^3$] | [F/g] | [F/cm$^3$] |
| | scan rate/ [mV/s] | | | | | | | | |
| cyclic voltammetry | 1 | 214 | 94 | 217 | 89 | 199 | 73 | 167 | 69 |
| | 10 | 177 | 78 | 177 | 73 | 152 | 67 | 155 | 64 |

TABLE 3-continued gravimetric and volumetric capacitance obtained with different methods

| | | aqueous electrolyte | | | | organic electrolyte | | | |
| --- | --- | --- | --- | --- | --- | --- | --- | --- | --- |
| | | coke of example 1 | | coke of example 2 | | coke of example 1 | | coke of example 2 | |
| Method | parameter | capacitance | | | | capacitance | | | |
| | 100 | 113 | 50 | 119 | 49 | 107 | 47 | 102 | 42 |
| | current density/ [A/g] | [F/g] | [F/cm$^3$] | [F/g] | [F/cm$^3$] | [F/g] | [F/cm$^3$] | [F/g] | [F/cm$^3$] |
| galvanostatic charging/ discharging | 0.2 | 211 | 93 | 215 | 88 | 161 | 71 | 171 | 70 |
| | 2 | 156 | 69 | 158 | 65 | 149 | 66 | 136 | 53 |
| | 20 | 63 | 28 | 76 | 31 | 67 | 30 | 68 | 28 |
| | frequency/ [mHz] | [F/g] | [F/cm$^3$] | [F/g] | [F/cm$^3$] | [F/g] | [F/cm$^3$] | [F/g] | [F/cm$^3$] |
| impedance spectroscopy | 1 | 210 | 93 | 199 | 82 | 149 | 66 | 168 | 69 |

The invention claimed is:

1. A method of manufacturing a porous coke suitable as a charge-storing material in electrochemical capacitors, which comprises the steps of:
 performing one of manufacturing and providing a non-calcined isotropic coke with one of spherical and onion-shaped morphology and low graphitizability as a starting material and with an interlayer distance $d_{002}$ determined by an X-ray diffraction method above 0.35 nm and an apparent stacking height $L_c$ below 6.5 nm;
 commingling with caustic alkali to obtain a homogenous mixture;
 heat-treating the homogenous mixture at a temperature in a range between 650 and 950° C. to obtain the porous coke, a specific surface area of the porous coke being at least 2,000 g/m$^2$ determined with the BET method, a maximum of a pore size distribution of the porous coke being in a transition region between micropores and mesopores; and
 washing and neutralization of the porous coke.

2. The method according to claim 1, wherein, and when the coke is heated-treated under inert gas atmosphere at 2,800° C., a mean interlayer distance c/2 determined from the X-ray diffraction peak $d_{002}$ is 0.3375 nm or higher and a crystallite size in c-direction ($L_c$) is below 35 nm, and $La_{110}$ is below 60 nm.

3. The method according to claim 1, wherein the starting material is a coke obtainable from a quenching oil used in quenching of a reaction gas in a synthesis of unsaturated hydrocarbons.

4. The method according to claim 1, wherein the starting material is a coke with a carbon content of at least 96% by weight and an ash value below 0.05% by weight.

5. The method according to claim 1, which further comprises selecting the caustic alkali from the group consisting of sodium hydroxide, potassium hydroxide and a mixture of sodium hydroxide and potassium hydroxide.

6. The method according to claim 1, which further comprises adjusting a weight ratio between the caustic alkaline and the porous coke to a range between 3:1 and 4:1.

7. The method according to claim 1, which further comprises performing the alkaline treatment in a continuous manner in a rotary kiln.

8. A non-calcined isotropic porous coke of one of spherical and onion-shaped morphology and low graphitizability, the porous coke comprising:
 a specific surface area of the porous coke is at least 2,000 g/m$^2$ determined with a BET method;
 a maximum of a pore size distribution of the porous coke being in a transition region between micropores and mesopores; and
 the porous coke being a coke with an interlayer distance $d_{002}$ determined by an X-ray diffraction method above 0.35 nm and an apparent stacking height $L_c$ below 6.5 nm, and is treated with caustic alkali at a temperature in a range between 650 and 950° C.

9. A non-calcined isotropic porous coke of one of spherical and onion-shaped morphology and low graphitizability, the porous coke comprising:
 a specific surface area of the porous coke is at least 2,000 g/m$^2$ determined with a BET method;
 the coke is heated-treated under inert gas atmosphere at 2800° C., a mean interlayer distance c/2 determined from the X-ray diffraction peak $d_{002}$ is 0.338 nm or higher and a crystallite size in c-direction ($L_c$) is below 25 nm, and $La_{110}$ is below 70 nm.

10. An electrode for an electrochemical capacitor, the electrode comprising:
 a charge-storing material being a non-calcined isotropic porous coke of one of spherical and onion-shaped morphology and low graphitizability, said porous coke having a specific surface area being at least 2,000 g/m$^2$ determined with a BET method;
 a binder; and
 with an aqueous electrolyte, a capacitance of at least 200 F/g is obtained at a cyclovoltametric scan rate of 1 mV/s or below, at a galvanostatic current of 0.2 A/g or below, or by impedance spectroscopy with a frequency of 1 mHz.

11. An electrode for an electrochemical capacitor, the electrode comprising:
 a charge-storing material being a non-calcined isotropic porous coke of one of spherical and onion-shaped morphology and low graphitizability, said porous coke having a specific surface area being at least 2,000 g/m$^2$ determined with a BET method;
 a binder; and with an organic electrolyte, a capacitance of at least 160 F/g is obtained at a cyclovoltametric scan rate of 1 mV/s or below, at a galvanostatic current of 0.2 A/g or below, or by impedance spectroscopy of a frequency of 1 mHz.

12. The electrode according to claim 10, further comprising a conductive auxiliary agent.

* * * * *